United States Patent
Tobescu

(10) Patent No.: US 10,441,506 B2
(45) Date of Patent: *Oct. 15, 2019

(54) PACKAGE FOR PHARMACEUTICAL PRODUCT, COMPRISING MINIATURIZED ELECTRONIC TAG FOR MONITORING PRODUCT INTEGRITY

(71) Applicant: Q-TAG AG, Ganterschwil (CH)

(72) Inventor: Corneliu Tobescu, Wilen (CH)

(73) Assignee: Q-TAG AG, Ganterschwil (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/890,508

(22) PCT Filed: May 13, 2014

(86) PCT No.: PCT/CH2014/000067
§ 371 (c)(1),
(2) Date: Nov. 11, 2015

(87) PCT Pub. No.: WO2014/183226
PCT Pub. Date: Nov. 20, 2014

(65) Prior Publication Data
US 2016/0166470 A1    Jun. 16, 2016

(30) Foreign Application Priority Data

May 15, 2013  (CH) .......................... 972/13
Jul. 4, 2013   (CH) ...................... 1208/13

(51) Int. Cl.
*A61J 1/18*       (2006.01)
*G06K 19/07*      (2006.01)
(Continued)

(52) U.S. Cl.
CPC ............ *A61J 1/18* (2013.01); *G06K 19/0717* (2013.01); *G06K 19/07701* (2013.01);
(Continued)

(58) Field of Classification Search
CPC .......... A61J 1/035; A61J 1/18; A61J 2205/60; G06K 19/0717; G06K 19/07701; G06K 19/07709; G06K 19/07798
See application file for complete search history.

(56) References Cited

U.S. PATENT DOCUMENTS

2001/0028308 A1* 10/2001 De La Huerga .. A61M 5/14212
340/573.1
2004/0066296 A1*  4/2004 Atherton ............ G08B 13/2434
340/572.1
(Continued)

FOREIGN PATENT DOCUMENTS

DE      10 2006 010 159      9/2007
GB           2469100         10/2010
WO         2004/079644        9/2004

OTHER PUBLICATIONS

Extended European Search Report dated Jan. 3, 2018, Application No. 17 20 6685, 9 pages.

*Primary Examiner* — Sisay Yacob
(74) *Attorney, Agent, or Firm* — Rankin, Hill & Clark LLP

(57) ABSTRACT

A retail package for a perishable product includes a box as an outer package; and an electronic tag for obtaining information relating to the integrity of the product as assessed from an exposure of the product to physical or environmental conditions during a time span. The tag has a main part including an electronics unit and a rip strip having a breakable electrical connection operationally connected to the electronics unit. The electronics unit includes a control unit; at least one sensor for monitoring the physical or environmental conditions; a display for displaying data relating to the integrity; and a switch. The control unit is structured and configured to detect a breaking of the electrical connection; to terminate the monitoring in reaction to detection of
(Continued)

breaking of the electrical connection; and to effect that the display unit displays the status data in reaction to an operation of the switch.

29 Claims, 5 Drawing Sheets

(51) Int. Cl.
*G06K 19/077* (2006.01)
*A61J 1/03* (2006.01)

(52) U.S. Cl.
CPC . *G06K 19/07709* (2013.01); *G06K 19/07798* (2013.01); *A61J 1/035* (2013.01); *A61J 2205/60* (2013.01)

(56) References Cited

U.S. PATENT DOCUMENTS

| | | | |
|---|---|---|---|
| 2006/0214765 A1* | 9/2006 | Pitchers | G06K 19/0705 340/3.4 |
| 2007/0273507 A1* | 11/2007 | Burchell | G01K 1/024 340/539.27 |
| 2007/0285229 A1 | 12/2007 | Batra et al. | |
| 2009/0045918 A1 | 2/2009 | Droesler et al. | |
| 2009/0189763 A1* | 7/2009 | Brinkley | G08B 13/126 340/541 |
| 2011/0254665 A1* | 10/2011 | Lindsay | G06K 19/0717 340/10.5 |
| 2013/0080784 A1 | 3/2013 | Oertli | |

* cited by examiner

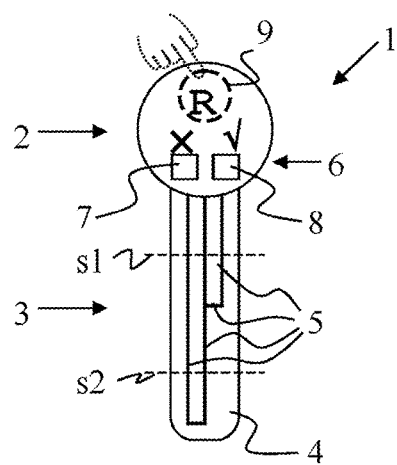
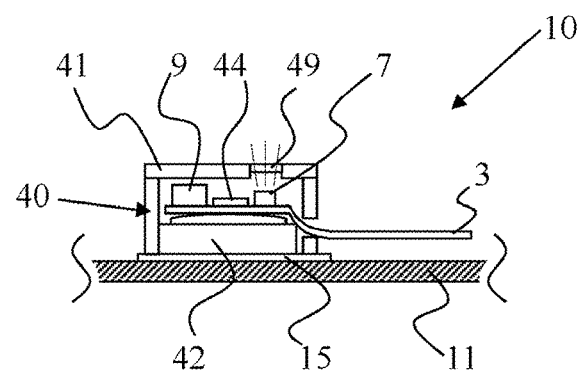
Fig. 1
Fig. 2
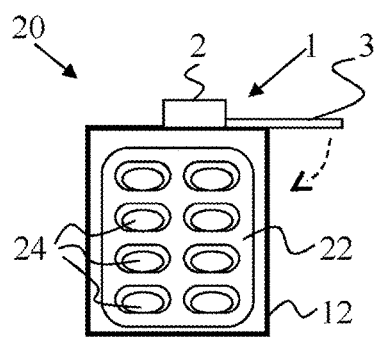
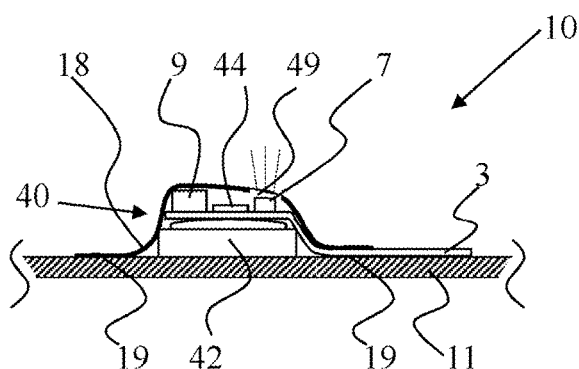
Fig. 4
Fig. 3
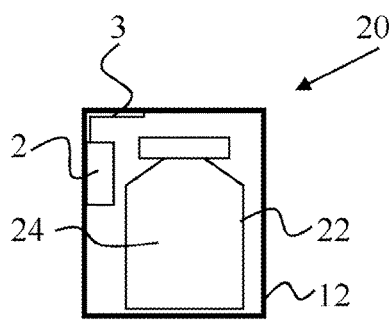
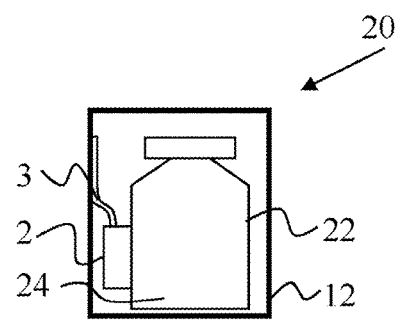
Fig. 5
Fig. 19

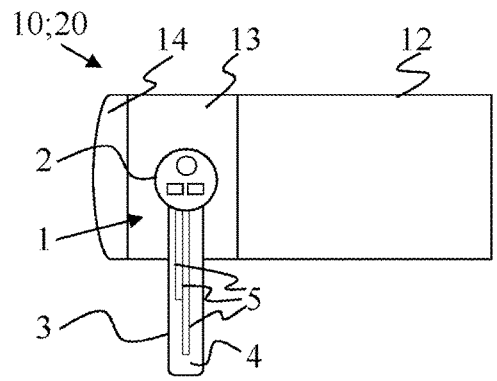
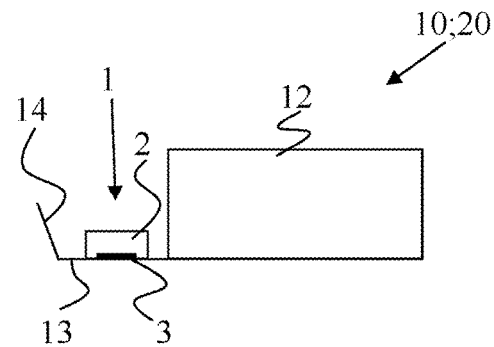
Fig. 6
Fig. 7
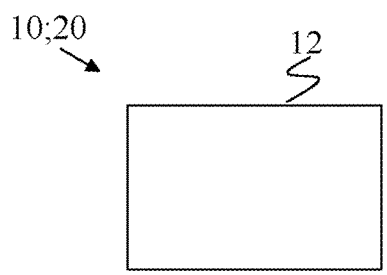
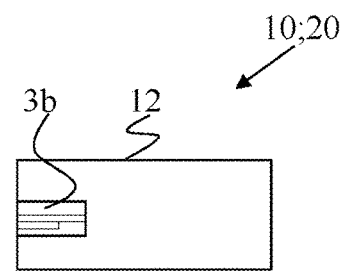
Fig. 8
Fig. 9
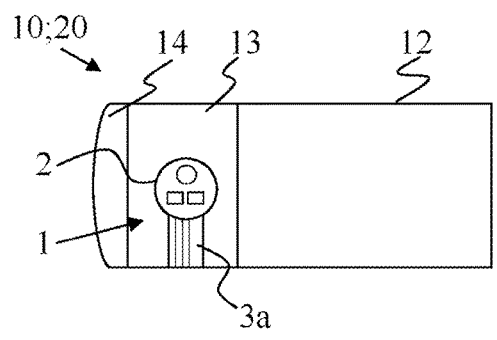
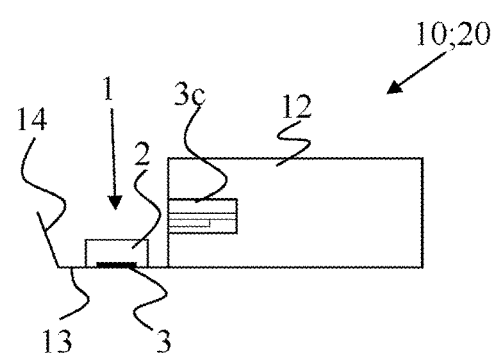
Fig. 10
Fig. 11

PACKAGE FOR PHARMACEUTICAL PRODUCT, COMPRISING MINIATURIZED ELECTRONIC TAG FOR MONITORING PRODUCT INTEGRITY

BACKGROUND OF THE INVENTION

Field of the Invention

The invention relates to the field of monitoring the integrity of pharmaceutical products which are sensitive to physical or environmental conditions. More generally, it relates to the monitoring of the integrity of perishable products. More particularly, the invention relates to ways of estimating the integrity of a pharmaceutical product as assessed from the exposure of the product to physical or environmental conditions up to at least approximately the time of its use.

Description of Related Art

The invention relates to methods and apparatuses that are used, for example, when a patient taking a medicament or a health care specialist giving the medicament to the patients wants to make sure that the medicament has not perished, in particular not perished during the time span between packaging the medicament and applying the medicament.

When it comes to sensitive or delicate goods such as pharmaceutical products or foods, it can be desirable to monitor their exposure to specific hazards such as particularly high or low temperatures, particularly high or low humidity (water-content of ambient air), or particularly strong impacts (hits, blows), so as to be able to estimate the integrity of the transported goods.

It is known to use chemical indicators for estimating the temperature exposure of a medicament. For example, a particular chemical substance is applied onto the outside of a bottle containing a fluid pharmaceutical product. If that substance is exposed to a too high or too low temperature during a too long time, its color is (visibly) changed. Corresponding products are commercially available.

Furthermore, RFID tags are frequently used by transport and logistics companies for monitoring the integrity of various goods during their transport from the manufacturer of the goods to a distributor or wholesaler. Such RFID tags are, e.g., attached to a trading unit on a palette, and results of measurements carried out in the RFID tag, e.g., temperature measurements, are wirelessly transmitted to the RFID reader in order to be evaluated and/or looked at then.

One object of the invention is to create a new way of enabling a person (finally) using a perishable product such as a pharmaceutical product, to check whether or not the product is—with a high probability—sound (flawless), in particular at (approximately) the time of using it.

Another object of the invention is to provide a simple way of enabling a person to check the integrity of a perishable product, in particular approximately at the time of its use.

Another object of the invention is to provide a cost-efficient way of enabling a person to check the integrity of a perishable product, in particular approximately at the time of its use.

Another object of the invention is to provide a way of enabling a person to check the integrity of a perishable product, in particular approximately at the time of its use, which is compatible with already established packaging and distribution schemes.

Another object of the invention is to provide a way of enabling a person to check the integrity of a perishable product without requiring the presence of any additional object for doing so, e.g., without a reading device.

Another object of the invention is to provide a way of minimizing the probability of fraud or deceit when it comes to prove or demonstrate an integrity status of a perishable, in particular pharmaceutical, product approximately at the time of its use.

Another object of the invention is to provide ways for preventing or reducing malpractice in conjunction with monitoring the integrity of sensitive products.

A corresponding retail package and a corresponding retail unit shall be provided, as well as a method for monitoring an integrity of a perishable product. And in addition, an electronic tag for obtaining information relating to the integrity of a product as assessed from an exposure of said product to physical or environmental conditions during a time span shall be provided and a method for manufacturing a retail unit.

Further objects emerge from the description and embodiments below.

The retail package for a perishable product comprises
a box as an outer package;
an electronic tag for obtaining information relating to the integrity of the product as assessed from an exposure of said product to physical or environmental conditions during a time span;
wherein said tag comprises
a main part comprising an electronics unit;
a rip strip comprising a breakable electrical connection operationally connected to said electronics unit.
Said electronics unit comprises
a control unit;
a sensor unit comprising at least one sensor for monitoring said physical or environmental conditions;
a display unit comprising a display for displaying data relating to said integrity referred to as status data;
a switch.
And said control unit is structured and configured for
detecting a breaking of said electrical connection;
terminating said monitoring in reaction to said detecting said breaking of said electrical connection; and for
effecting that said display unit displays said status data in reaction to an operation of said switch.

Such a retail package can be very compact and cost-efficient. And it can make possible that a user who wants to use or apply the product (who usually is not a person trading it or dealing with it), such as, in case of a medical product, a patient or a health care specialist, can in a simple and direct way and without further education and without needing further equipment or tools operate the tag and find out about the integrity of the product, in particular at (approximately) the time of using or applying the product.

The term "retail package" is used in order to distinguish the package from wholesale packages or bundles. The latter comprise high numbers of retail packages and do not reach a user of the product. The retail package usually is the lowest package level to be sold (under normal circumstances). Inside said box, there is usually no further box present, in particular not a (further) cardboard box, more particularly not a (further) folding carton. However, the product usually is contained in a container, the container being inside the box. In case of pharmaceutical products, the box usually also contains a package insert, which usually is one piece of paper explaining details concerning the product, such as its composition, its effects and adverse reactions and dosage instructions. A retail package may contain one or more doses of the product. And it may be a package for patients or for clinics.

As is usually the case for tags for integrity monitoring, it is assumed that said perishable product is exposed to approximately the same physical or environmental conditions as is the tag.

The time span usually is a time span during which the product is stored or transported.

The switch usually is a user-operable switch. Suitable switches can be, e.g., electro-mechanical switches or capacitive switches.

It is usually provided that when the rip strip is ripped (in a suitable place), the electrical connection is broken, e.g., because one or more conductor lines (in particular a conductor line loop) of the rip strip is interrupted. This can be detected by the control unit, e.g., by sensing an increase of an ohmic resistance. It may be an indication of an end of the time span, and thus, the monitoring can be terminated in reaction thereto.

The rip strip usually is a flat member (its extension in a first dimension being clearly smaller than in the other two) and has an elongated shape (its extension in a second dimension being smaller than in the third dimension). The breaking said electrical connection usually takes place by dividing (cutting, tearing apart) the rip strip generally along the second dimension.

The display usually is a visual display.

Displaying the status data in reaction to an operation of the switch is effected at least after the end of the time span. This can make possible to review the integrity status the product had when the box was opened and/or when the product was accessed and/or when the product was applied. It may, however be provided that displaying the status data in reaction to an operation of the switch is also effected already before the end of the time span. This can make possible early checks of the product integrity.

In any event, the display does usually not permanently display the status data. This saves energy and thus makes possible a long operation duration of the tag and thus a long shelf life of the retail package and of the retail unit.

Furthermore, it can be provided that displaying the status data takes place only in reaction to operating the switch. However, it may also be provided that it takes place also in reaction to terminating the monitoring and thus at the end of the time span and thus usually when the breakable electrical connection is broken. And alternatively or additionally thereto, it may be provided that displaying the status data takes place periodically, e.g., in regular time intervals, the (pause) interval typically being between 1 second and 2 minutes, in particular between 5 seconds and 30 seconds. Such an "automatic" display of the status data may take place after the end of the time span only or during the time span only or both, i.e. from the beginning of the time span. Looking at the display in the right moment (or waiting for up to one the pause interval) may thus dispense with operating the switch when the integrity status shall be checked.

In one embodiment, said perishable product is a pharmaceutical product. The pharmaceutical product can be, e.g., a synthetic pharmaceutically active substance, a natural pharmaceutically active substance, a vaccine. Pharmaceutical products are often provided in form of tablets, capsules, powder, liquids, emulsions.

In another embodiment, the perishable product is perishable food, a food product.

In another embodiment, said perishable product is perishable chemical sub stance.

In one embodiment which may be combined with one or more of the before-mentioned embodiments, the main part is attached to the box. In particular, the main part can be attached to an inside of the box. But attaching the main part to the outside of the box is possible, too.

In an alternative embodiment, the main part is attached to a card present inside the box.

Attaching the main part (to the box or to the card) can be accomplished by, e.g, bonding, gluing, using a fluidly applicable glue, using a double-faced adhesive tape, using a polymer cover foil sandwiching the main unit between itself and the box and including a circumferential portion surrounding the main part, which is bonded to the box, or in another way.

In one embodiment, which may be combined with one or more of the before-mentioned embodiments, the box is a cardboard box, more particularly a folding carton.

In one embodiment, which may be combined with one or more of the before-mentioned embodiments, the rip strip is attached to the box. It may, in particular be provided that the rip strip is attached to an inside of the box. But attaching the rip strip to the outside of the box is possible, too. And the rip strip may, in one region of the rip strip, be attached to an inside of the box and, in addition, in another region of the rip strip, be attached to an outside of the box.

In an alternative embodiment, the rip strip is attached to a card present inside the box. That card may be (and usually is) identical with the above-mentioned card to which the main part of the tag may be attached.

Attaching the rip strip (to the box or to the card) can be accomplished by, e.g, bonding, gluing, using a fluidly applicable glue, using a double-faced adhesive tape. The attaching may be accomplished in one or more regions of the rip strip, in particular over a major portion of a face of the rip strip.

In one embodiment, which may be combined with one or more of the before-mentioned embodiments, the rip strip is attached to the box, and the box is designed to have one or more opening sides at which the box can be opened in order to access the product when the product is present inside the box, and the rip strip is attached to the box in such a way that the electrical connection is broken when the box is opened at one of the opening sides. This may constitute a security feature. It may in particular be provided that the box is designed to have exactly one opening side (i.e. no more and no less than one opening side). This facilitates the application of the rip strip. For example, in case the box is an otherwise conventional folding carton, one original opening side can be sealed, e.g., by gluing the (tongue-like) flap to an inner surface of the folding carton, and the oppositely arranged opening side remains as the only opening side. But it may also be provided that the box is designed to have exactly two opening sides (i.e. no more and no less than two opening sides). This allows, at least in case the box is a conventional folding carton, to dispense with additional manufacturing steps for sealing one of the opening sides.

Opening the box may in particular include moving a portion of the box versus another portion of the box, in particular it may include, e.g., when the box is a folding carton, pulling a (tongue-like) flap of the box out of the box, the flap forming a tongue of a side part of the box, the flap sitting next to another side part of the box when the box is closed.

A possible alternative to the above embodiment (in which a link between opening the box and ripping the rip strip is enforced in the described way) is to provide with the box, in particular inside the box, a card unit, the card unit including the tag and a card, e.g., a card made of cardboard or a polymer-based card. The tag will usually be attached to the card, either the main part only or the rip strip only or, rather, both.

On the card, a textual and/or graphical description indicating to break the connection when opening the box and/or indicating to break the connection when accessing the product and/or indicating to break the connection when using or applying the product may be provided. This can facilitate the handling of the retail package. The textual and/or graphical description may additionally or alternatively be present on the box (in particular printed thereon).

In one embodiment which may be combined with one or more of the before-mentioned embodiments, the rip strip comprises or essentially is a printed circuit board (PCB). It may, in particular, include or essentially be a flexible printed circuit board. And, more particularly, it may include or essentially be a foil in and/or on which at least one conductor line is present which is operationally connected to the electronics unit. The at least one conductor line forms the breakable electrical connection and it may, in particular, describe a loop. The foil may, in particular, be an electrically insulating polymer foil. The (usually flexible, but possibly rigid) printed circuit board is operationally connected to the electronics unit, more particularly one or more conductor lines of the (flexible) printed circuit board are. The rip strip and the electronics unit may share one and the same printed circuit board; the PCB of the rip strip may be continuous with a PCB of the electronics unit.

It may be provided that the rip strip comprises a foil and, present on the foil, at least one conductor line operationally connected to the electronics unit. In particular, the at least one conductor line may form at least one loop. Typically one or two loops, perhaps three are provided. Each loop may constitute one breakable electrical connection. In case of a single loop, the interruption thereof usually will indicate that the product is about to be accessed and/or indicate that the end of the time span has come (and the monitoring is terminated). In case of two loops, the first is like the before-described single one, and the interruption of the second loop usually will indicate that the product is about to be packaged in the box (or has just been packaged in the box) and/or indicate the beginning of the time span (and thus the start of the monitoring). In case of three loops, yet another functionality may be added to those of the before-described ones.

In one embodiment, which may be combined with one or more of the before-mentioned embodiments, the display unit is structured and configured for displaying the status data by flashing. In other words, the status data are encoded in flashing.

In one embodiment, which may be combined with one or more of the before-mentioned embodiments, the display unit includes one or more light emitters for emitting light pulses, and wherein the data is encoded in a sequence of light pulses emitted by the one or more light emitters. This can allow to realize the tag and thus also the retail package in a particularly small and particularly cost-efficient way, and it may simplify the manufacture of the tag. The data may more particularly be encoded in one or more of the color of the light pulses;
a duration of the light pulses;
the number of the light pulses in the sequence.

The light emitters may, in particular, be light emitters for selectively emitting light of at least two different colors. For example, a light source for emitting green light and a light source for emitting red light may be provided.

The light emitters may be, e.g., LEDs (light emitting diodes). LEDs have a low power consumption, which can contribute to a long operating duration of the tag.

Usually, the tag includes merely exactly one display (and not an additional one).

In view of the above-described (and below-described) ways of realizing the display, it is possible to provide that the display is a not-graphical display, at least in the sense that a graphical display would allow to visualize a plurality of different shapes (such as shapes symbolizing letters and/or numbers).

Providing a display of the above-described kind may allow to dispense with graphical displays, at least in the sense that a graphical display would allow to visualize a plurality of different shapes (such as shapes symbolizing letters and/or numbers).

In one embodiment, which may be combined with one or more of the before-mentioned embodiments, the display automatically displays the status data periodically. The displaying may take place, e.g., in intervals of at least 1 second, more particularly of at least 5 seconds, and/or of at most 2 minutes, more particularly of at most 40 seconds. This may make dealing with the retail package easier, but usually at the expense of battery power.

In one embodiment, which may be combined with one or more of the before-mentioned embodiments, the box has a transparent portion (or window), and the tag is attached inside the box such that the display is visible through transparent portion (from the outside). This may make possible to prevent tampering with the tag (at least tampering without opening the box), while allowing to see the display. Access to the switch, so as to allow operating the switch (without opening the box) may be provided, e.g., by operating the switch through the window.

In one embodiment, which may be combined with one or more of the before-mentioned embodiments, the control unit is structured and configured for receiving data or signals from the sensor unit, the data or signals being indicative of currently present physical or environmental conditions, and for obtaining the status data from these data or signals. In order to accomplish the latter, the status data are usually obtained in dependence of predescribed limitations for the exposure of the product to the physical or environmental conditions. Those predescribed limitations are usually stored in the tag, in the electronics unit, in form of corresponding data. For example, the control unit usually will compare the current conditions to threshold values such as a value that shall never be exceeded and/or a value that shall never be fallen short of and/or a value that may be exceeded (or fallen short of) for only less than a prescribed time duration. If an alarm condition is met because of extreme values (or extreme values during a too long time duration), it must be assumed that the integrity of the product is not present anymore, i.e. that the product is not in sound condition anymore. This fact can be indicated by the display of the tag, wherein it is possible to provide that different types of alarm conditions are indicated by the display in different ways.

Accordingly, the status data are usually indicative of events (in particular failures) that have occurred after an initial point in time, namely after the moment when the integrity monitoring has started, i.e. after the beginning of the time span. Status data usually reflect only events (in particular failures) that have occurred during the time span. A failure usually is a deviation from or transgression of the above-mentioned predescribed limitations, e.g., an exceeding of a threshold value.

In one embodiment referring to the before-mentioned embodiment, data representative of the predescribed limitations are programmable. Usually, such data are stored in the electronics unit, and in case they are programmable, there is no limitation to one (i.e. to a single) set of such data. This can make possible to use one and the same tag for different products of different sensitivity to the physical or environmental conditions. Thus, it can be sufficient to store only tags of a single type for many different products instead of one type of tag for each type of product.

In one embodiment referring to the before-mentioned embodiment, the rip strip includes at least two contact pads (providing electrical contacts), which are operationally (usually electrically and more particularly galvanically) connected to the electronics unit, and the data representative of the predescribed limitations are programmable by means of signals (usually digital signals) applied to the contact pads. In a first possibility, it can be provided that one of a plurality of sets of such data representative of the predescribed limitations are selectable by the applied signals. Those sets of data (including at least one value each, such as a maximally allowed temperature) are in this case usually stored in the electronics unit, such that sufficient memory space for the plurality of data sets is required in the electronics unit. However, programming may be accomplished rather rapidly this way. For example, if a specific type of tag shall be used for monitoring one of various, e.g., twenty, different products (in particular pharmaceutical products), each having different prescribed limitations, a corresponding number of sets of, e.g., threshold temperatures (and possibly also time durations) may be stored in the electronics unit, and when a specific product shall be monitored, the signals applied to the contact pads allow to select the suitable set of data, such that these are applied in the subsequent monitoring. In a second possibility, the data representative of the predescribed limitations are entered into the electronics unit by applying the signals. This provides additional flexibility and requires only relatively little storage space in the electronics unit. The programming, however, may be more time consuming than in case of the first possibility. Referring again to the contact pads, it can be provided that these are arranged in such a location of the rip strip that they are removed from the tag when the rip strip is ripped for indicating that the monitoring shall start, i.e. for indicating the beginning of the time span. As has been described further above, a first and a second loop may be provided, a detection of an interruption of the second loop indicating the beginning of the time span. The contact pads may thus in particular be located, with respect to a coordinate from the main part of the tag along the extension of the rip strip (which usually is a coordinate along the direction of the largest extension of the rip strip), at a location beyond the location of that portion of the second loop which is located farthest along the coordinate. A ripping of the rip strip along a direction approximately perpendicular to the coordinate by which the second loop is opened (interrupted) will thus usually also result in a cutting off of the contact pads from the tag. Attempts to try to program the tag (more particularly to program data representative of the predescribed limitations) after monitoring has started can be impeded this way.

It is to be noted that, generally, it would also be possible, as an alternative or as an addition to the described programming tags, to provide a contactless programming, e.g., via electromagnetic radiation. This might, with respect to the above-described provision of contact pads for programming, result in a faster programming (programming possibly taking place simultaneously with other process steps during packaging) and in higher tag manufacturing costs and possibly also in larger outer dimensions of the tag, more particularly of the main part of the tag.

Status data displayed after the monitoring (measuring, sensing) has been terminated, i.e. after the end of the time span may be referred to as "final" status data. In that case, all alarms may be indicated that occurred between the initial point in time at which monitoring began and the time of termination of the monitoring. It is furthermore possible to provide that these "final" status data are also displayed (even without operating the switch) when the monitoring is terminated. This makes possible an immediate check of the integrity status. And a calculation and/or a storing step may also take place at that time, so as to obtain these "final" status data and store them in the tag, so as to readily have access to them later on.

If it is provided that status data may be displayed by the display already during the time span, e.g., in reaction to operating the switch, these status data certainly merely reflect those alarm conditions which were met up to that instant.

Furthermore, it is also possible to provide that in addition to displaying status data by means of the display (or as an alternative thereto), status data can be transmitted by the tag via electro-magnetic radiation in the radio-frequency (RF) range (radio-frequency radiation).

In one embodiment, which may be combined with one or more of the before-mentioned embodiments, the tag, in particular the electronics unit, includes an RF receiver and an RF transmitter, or an RF transceiver, and the control unit is structured and configured for effecting that the status data are transmitted using the RF transmitter or the RF transceiver. This transmission of status data may be effected in reaction to an operation of the switch and/or in reaction to receiving, in the tag, a corresponding request signal by means of the RF receiver or RF transceiver. An RF reading device may, this way, receive status data from the tag, in a contact-less fashion. This may be of advantage when a large number of syringes shall be examined with respect to their individual product integrity.

In one embodiment, which may be combined with one or more of the before-mentioned embodiments, the tag includes no RFID (Radio Frequency Identification) responding capability. However, it is, as an alternative also possible to provide that the tag includes RFID responding capability.

In one embodiment, which may be combined with one or more of the before-mentioned embodiments except for the last-mentioned one, the tag includes RFID (Radio Frequency Identification) responding capability. For example, the tag (in particular the electronics unit) includes an RF receiver and an RF transmitter, or an RF transceiver. This may allow to identify in a contactless fashion, each individual tag and thus each individual retail package (or retail unit, cf. below). In this case, each tag may be provided with a unique identifier, which typically would be stored in the electronics unit, and which can be transmitted by the tag via RF, e.g., to an RFID reader. This may allow to achieve a quick overview over a large number of retail packages (or retail units, cf. below), e.g., in order to check which retail packages (or retail units, cf. below) are present (and thus, which retail packages or retail units, cf. below, would possibly be missing).

In one embodiment, which may be combined with one or more of the before-mentioned embodiments, the physical or environmental conditions include a temperature, in particular an ambient temperature.

In one embodiment, which may be combined with one or more of the before-mentioned embodiments, the physical or environmental conditions include a pressure, in particular an ambient pressure.

In one embodiment, which may be combined with one or more of the before-mentioned embodiments, the physical or environmental conditions include a humidity, in particular a relative humidity (water content) of the (ambient) air.

In one embodiment, which may be combined with one or more of the before-mentioned embodiments, the physical or environmental conditions include an acceleration.

In one embodiment, which may be combined with one or more of the before-mentioned embodiments, the sensor unit (and/or the control unit) is structured and configured for measuring the physical or environmental conditions at various times during the time span, in particular in regular intervals.

In one embodiment, which may be combined with one or more of the before-mentioned embodiments, the main part includes a housing, e.g., made of a polymer, containing the electronics unit. In particular, the housing has an opening through which the electronics unit can be pushed into the housing.

In one embodiment, which may be combined with one or more of the before-mentioned embodiments, the electronics unit includes a battery, usually for powering other constituents of the electronics unit.

The retail unit includes a retail package of any of the described kinds and further includes the perishable product.

In one retail unit embodiment, the retail unit is a pharmaceutical retail unit, and the perishable product is a pharmaceutical product. However, other perishable or delicate products are, more generally, also contemplated, such as food products or chemical products.

In one embodiment, which may be combined with the last-mentioned embodiment, the retail unit includes one or more containers containing the product. Such a container may be an enclosure for the product. Typical containers, at least for pharmaceutical products, are blister packages, vials, tubes, flacons, vessels, bags such as polymer foil bags.

In one embodiment, which may be combined with one or more of the before-mentioned retail unit embodiments, the main part is attached to the container—as an alternative to being attached to the box or to the card.

In one embodiment, which may be combined with one or more of the before-mentioned retail unit embodiments, the rip strip is attached to the container. This may be provided alternatively or in addition to having the rip strip attached to the box or to the card.

The invention includes retail units with features of corresponding retail packages according to the invention, and, vice versa, also retail packages with features of corresponding retail units according to the invention.

The advantages of the retail units basically correspond to the advantages of corresponding retail packages, and, vice versa, the advantages of the retail packages basically correspond to the advantages of corresponding retail units.

The method for monitoring an integrity of a perishable product includes the steps of
  providing an electronic tag; and
  providing a box as an outer package for the perishable product;
  wherein the tag is a tag for obtaining information relating to the integrity of the product as assessed from an exposure of the product to physical or environmental conditions during a time span, wherein the tag comprises a main part comprising an electronics unit;
  a rip strip comprising a breakable electrical connection operationally connected to the electronics unit.
  And the electronics unit includes
  a control unit;
  a sensor unit having at least one sensor for monitoring the physical or environmental conditions;
  a display unit having a display for displaying data relating to the integrity referred to as status data;
  a switch.
  And the control unit is structured and configured for
  detecting a breaking of the electrical connection;
  terminating the monitoring in reaction to the detecting the breaking of the electrical connection; and for
  effecting that the display unit displays the status data in reaction to an operation of the switch.

In one method embodiment, the method includes the step of bonding the main part to the box. Therein, it may in particular be bonded to a face of a side part of the box, the face facing the inside of the box when the box is closed ("inside of box"). Alternatively, the method may include the step of bonding the main part to a container containing the product. And in another alternative, the method includes the step of bonding the main part to a card present in the box.

In one method embodiment, which may be combined with the before-mentioned method embodiment, the method comprises the step of bonding at least a portion of the rip strip to the box. Therein, it may in particular be bonded to a face of a side part of the box, which face faces the inside of the box when the box is closed.

In one method embodiment, which may be combined with one or more of the before-mentioned method embodiments, the method includes the step of bonding at least a portion of the rip strip to a container containing the product. Note that it is possible to provide that one portion of the rip strip may be bonded to the box and another portion of the rip strip is bonded to the container.

In one method embodiment, which may be combined with one or more of the before-mentioned method embodiments, the method includes the step of ripping the rip strip. The ripping of the rip strip may be accomplished for terminating the integrity monitoring (and ending the time span).

In one method embodiment, which may be combined with one or more of the before-mentioned method embodiments, the method includes the step of operating the switch. Operating the switch may be accomplished for requesting a displaying of the status data.

In one method embodiment, which may be combined with one or more of the before-mentioned method embodiments, the tag includes at least one sensor for sensing the physical or environmental conditions, the method including the step of
  by means of the sensor, creating data or signals representative of the physical or environmental conditions at various times during the time span.

In one method embodiment, which may be combined with one or more of the before-mentioned method embodiments, the method includes the step of inserting the product into the box and closing the box.

The invention includes monitoring methods with features of corresponding retail packages or retail units according to the invention, and, vice versa, also retail packages and retail units with features of corresponding monitoring methods according to the invention.

The advantages of the monitoring methods basically correspond to the advantages of corresponding retail packages or retail units, and, vice versa, the advantages of the retail packages and retail units basically correspond to the advantages of corresponding monitoring methods.

The method for manufacturing a retail unit including a perishable product include the steps of a) providing the product;
b) providing an unfolded folding carton;
c) folding the folding carton;
d) inserting the product into the folded folding carton;
e) providing an electronic tag for obtaining information relating to the integrity of the product as assessed from an exposure of the product to physical or environmental conditions during a time span, the tag comprising a main portion and a rip strip;
f) attaching the tag to the folding carton.

The tag includes
the main part having an electronics unit;
the rip strip having a breakable electrical connection operationally connected to the electronics unit;
and the electronics unit includes
a control unit;
a sensor unit having at least one sensor for monitoring the physical or environmental conditions;
a display unit having a display for displaying data relating to the integrity referred to as status data;
a switch;
wherein the control unit is structured and configured for detecting a breaking of the electrical connection;
terminating the monitoring in reaction to the detecting the breaking of the electrical connection; and for
effecting that the display unit displays the status data in reaction to an operation of the switch.

The method further includes the step of
g) starting monitoring the exposure of the product to the physical or environmental conditions by manipulating a part of the tag, in particular by breaking another electrical connection, more particularly by ripping the rip strip.

It is to be noted that the method steps do not necessarily need to be carried out in the cited order. For example, it is possible to carry out step f) before carrying out step c); and step g) may be carried out before carrying out step c) and/or before carrying out step f); and step d) may be carried out after step f) and/or after step g).

In step d), the product may be contained in one or more containers, the container(s) being inserted into the folded folding carton in step d).

Alternatively to step g), the following step g') may be carried out:

g') starting monitoring the exposure of the product to the physical or environmental conditions by operating an initiating switch of the tag, wherein the initiating switch is identical with or different from the before-mentioned switch.

Further details concerning possible initiating switches are described further below.

The invention includes manufacturing methods with features of corresponding retail packages or retail units or monitoring methods according to the invention, and, vice versa, also retail packages and retail units and monitoring methods with features of corresponding manufacturing methods according to the invention. For example, the bonding steps described for the monitoring methods may also be provided in the manufacturing methods. And, e.g., step g) or step g') described for the manufacturing methods, may also be provided in the monitoring methods.

The advantages of the manufacturing methods basically correspond to the advantages of corresponding retail packages or retail units or monitoring methods, and, vice versa, the advantages of the retail packages and retail units and/or monitoring methods basically correspond to the advantages of corresponding manufacturing methods.

The electronic tag for obtaining information relating to the integrity of a product as assessed from an exposure of the product to physical or environmental conditions during a time span includes:

a main part including an electronics unit;
a rip strip including a breakable electrical connection operationally connected to the electronics unit;
wherein the electronics unit includes:
a control unit;
a sensor unit including at least one sensor for monitoring the physical or environmental conditions;
a display unit including a display for displaying data relating to the integrity referred to as status data;
a switch.

And the control unit is structured and configured for
detecting a breaking of the electrical connection;
terminating the monitoring in reaction to the detecting the breaking of the electrical connection; and for
effecting that the display unit displays the status data in reaction to an operation of the switch.

The invention includes tags with features of corresponding retail packages or retail units or methods according to the invention, and, vice versa, also retail packages and retail units and methods with features of corresponding tags according to the invention.

The advantages of the tags basically correspond to the advantages of corresponding retail packages or retail units or methods, and, vice versa, the advantages of the retail packages and retail units and methods basically correspond to the advantages of corresponding tags.

In a specific view upon the invention, the switch is dispensed with and, accordingly, also the property of the control unit to be structured and configured for effecting that the display unit displays the status data in reaction to an operation of the switch is dispensed with and is, moreover, replaced by a functionality (provided by the control unit) that the "final" status data are displayed (for some time duration such as between 1 second and 1 minute) when the monitoring is terminated.

Thus, in that first particular aspect of the invention, the retail package for a perishable product includes a box as an outer package;
an electronic tag for obtaining information relating to the integrity of the product as assessed from an exposure of the product to physical or environmental conditions during a time span;
wherein the tag includes
a main part comprising an electronics unit;
a rip strip comprising a breakable electrical connection operationally connected to the electronics unit.

The electronics unit includes
a control unit;
a sensor unit having at least one sensor for monitoring the physical or environmental conditions; and
a display unit having a display for displaying data relating to the integrity referred to as status data.

And the control unit is structured and configured for
detecting a breaking of the electrical connection;
and for
terminating the monitoring; and
effecting that the display unit displays the status data;
in reaction to the detecting the breaking of the electrical connection.

The methods, the retail unit and the tag in this first particular aspect have, of course, corresponding features.

This makes possible an immediate check of the integrity status when terminating the monitoring, and the tag can be even smaller an less costly due to not having to provide a switch.

Of course, the other features and embodiments described above or below in the present patent application compatible with this first particular aspect of the invention may also be applied to or combined with this first particular aspect of the invention.

In particular, it may be provided also in this aspect, that a calculation and/or a storing step takes place at the time of terminating the monitoring (in reaction to the detecting the breaking of the electrical connection), so as to obtain the "final" status data and store them in the tag, so as to readily have access to them later on.

And also, it may be provided that displaying the status data takes place periodically, e.g., in regular time intervals.

In another specific view upon the invention, the rip strip is dispensed with—at least in its function as a means for effecting a terminating of the monitoring—and, accordingly, also the property of the control unit to be structured and configured for detecting a breaking of the electrical connection and for terminating the monitoring in reaction to the detecting the breaking of the electrical connection is dispensed with and is, moreover, replaced by a functionality (provided by the control unit) that the monitoring is terminated in reaction to an operation of a switch we shall refer to as terminating switch. That terminating switch may be identical with or different from the switch ("display switch") for effecting the displaying of the status data (if present). If the switches are identical, different effects may be provoked by differently operating the switch. For example, a brief operation of the switch (e.g., for at most 1 or 1.5 seconds) provokes a displaying of the status data, whereas a longer operation (e.g., for more than 8 seconds) effects a termination of the monitoring.

Thus, in that second particular aspect of the invention, the retail package for a perishable product includes
 a box as an outer package;
 an electronic tag for obtaining information relating to the integrity of the product as assessed from an exposure of the product to physical or environmental conditions during a time span;
wherein the tag includes a main part having an electronics unit.
 The electronics unit includes
 a control unit;
 a sensor unit including at least one sensor for monitoring the physical or environmental conditions;
 a display unit including a display for displaying data relating to the integrity referred to as status data;
 a display switch and a terminating switch, wherein the display switch and the terminating switch are identical or are different from each other.
And the control unit is structured and configured for
 terminating the monitoring in reaction to an operation of the terminating switch; and for
 effecting that the display unit displays the status data in reaction to an operation of the display switch.

The methods, the retail unit and the tag in this second particular aspect have, of course, corresponding features.

This provides an alternative way of terminating the monitoring, and the monitoring may be terminated in a contactless manner, e.g., when a magnetic or an inductive terminating switch is used and also in case of a capacitive switch.

Of course, the other features and embodiments described above or below in the present patent application compatible with this second particular aspect of the invention may also be applied to or combined with this second particular aspect of the invention.

It is furthermore, in yet another aspect of the invention, possible to provide a single switch that fulfills at least three different functions accessible by differently operating the switch. These functions may in particular be: starting the monitoring; terminating the monitoring; requesting a displaying of the status data (usually during the whole time span and thereafter, too, namely then displaying the "final" status data). The different ways of operating may be operating the switch for time durations in different non-overlapping time intervals. For example, operating the switch for less than 2 seconds is interpreted by the control unit as a request for displaying status data, operating the switch for a duration between 3 and 6 seconds is interpreted by the control unit as a request for starting the time span (and thus the monitoring), and operating the switch for more than 9 seconds is interpreted by the control unit as a request for ending the time span and thus terminating the monitoring.

BRIEF DESCRIPTION OF THE DRAWINGS

Below, the invention is described in more detail by means of examples and the included drawings. The figures show schematically:

FIG. 1 a top view onto an electronic tag;
FIG. 2 a cross-sectional view of an attached electronic tag;
FIG. 3 a cross-sectional view of an attached electronic tag;
FIG. 4 a symbolic cross-sectional view of a retail unit;
FIG. 5 a symbolic cross-sectional view of a retail unit;
FIGS. 6, 8, 10 symbolic top views onto a retail package or a retail unit;
FIGS. 7, 9, 11 symbolic side views onto the retail package or retail unit of FIGS. 6, 8, 10;
FIG. 19 a symbolic cross-sectional view of a retail unit.

DETAILED DESCRIPTION OF THE INVENTION

Figure 12:
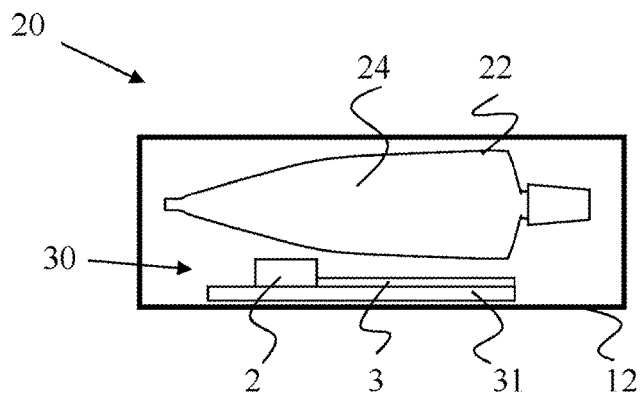
FIG. 12 a symbolic cross-sectional view of a retail unit containing a card with attached electronic tag.

The described embodiments are meant as examples and shall not limit the invention.

FIG. 1 shows a schematized top view onto an electronic tag 1. Tag 1 includes a temperature sensor or a sensor for some other physical or environmental condition. The tag can monitor that magnitude and decide whether or not certain (predescribed) conditions concerning that magnitude are met, e.g., whether or not a threshold value has been exceeded and possibly also for how long it has been exceeded. Depending on the monitored (sensed or measured) values (of temperature, pressure, humidity, acceleration or others and usually also of the time), one or more types of alarm indications can be provided by the tag, depending on the type of event or failure that occurred. Since such functionalities are known from prior art, e.g., from RFID tags, we will not go into much detail here concerning this point.

Tag 1 of FIG. 1 includes a main part 2 and a rip strip 3 that are mutually interconnected. The main part 2 typically has a volume of at most 35 mm×30 mm×12 mm, in particular having a side length of, at most, the specified lengths, and more particularly, it may have a volume of at most 25 mm×20 mm×10 mm, and in particular a side length of, at most, the specified lengths.

The main part 2 includes an electronics unit having i.a. a user-operable switch 9 (cf. the dotted hand symbol in FIG. 1) and a display 6 substantially consisting of two light emitters 7, 8 such as two LEDs, in particular a red LED and a green LED. The rip strip 3 substantially consists of a printed circuit board (PCB) or of a piece or part thereof and more particularly of PCB base material 4 in and/or on which conductor lines 5 are present. It is particularly suitable to provide, as the rip strip 3, an electrically insulating foil 4 such as a polymer foil provided with conductor lines 5.

In fact, the electronics unit (having reference symbol 40 in further figures) and the rip strip 3 may be considered to share one printed circuit board. And the electronics unit 40 may be considered to be a printed circuit board assembly (PCB assembly or PCBA), i.e. a PCB with components mounted thereon (the components being described above and also below), wherein the PCB forming the rip strip 3 is continuous with the PCB of the PCBA representing the electronics unit 40.

FIG. 2 shows a schematic cross-sectional view of an attached electronic tag 1, and at the same time, FIG. 2 may be interpreted to show a schematized detail of a retail package 10. The tag 1 of FIG. 2 may be identical with the one of FIG. 1.

Tag 1 includes electronics unit 40 in its main part 2 and rip strip 3, each having a portion of one and the same PCB, which may be a flexible PCB.

Main part 2 includes a housing 41 in which electronics unit 40 is present. Electronics unit 40 includes, besides the PCB and mounted thereon, an energy source such as a battery 42, the above-mentioned switch 9 which may be, e.g., an electro-mechanical switch or a capacitive switch, the light emitters of the display (only LED 7 being illustrated in FIG. 2) and an integrated circuit (IC) 44 such as an ASIC (application-specific IC). IC 44 may embody a control unit and a sensor unit, but it is also possible that a separate sensor unit is mounted on the PCB.

It is possible that data sensed by a sensor of the sensing unit are continuously (or quasi-continuously) taken, but usually, measuring or sensing takes place in time intervals of between 30 seconds and 12 hours, more particularly between 1 minute and 30 minutes, so as to save energy.

Housing 41 may be made substantially of a material that is sufficiently transparent for letting light emitted by light emitters 7, 8 of tag 1 pass through such that it is visible from the outside, or may have, as indicated in FIG. 2, a transparent portion 49 for that purpose.

In order to attach tag 1 to a tag carrier 11 such as a piece of cardboard, a double-faced adhesive tape 15 may be used. An alternative would be to use a different bonding technique such as the application of an initially liquid bonding material such as a glue. A bonding may take place between the housing 41 and the tag carrier 11, and it is possible, as indicated in FIG. 2, to provide that it takes place, in addition between the battery 42 and the tag carrier 11. In the latter case, the adhesive tape 15 or other bonding material may function as a part of the housing of the tag 1.

An alternative way of attaching tag 1 to a tag carrier 11 is illustrated in FIG. 3. In the embodiment of FIG. 3, the tag may be identical with the one of FIG. 1, and its electronics unit 40 may be identical with the one of FIG. 2. However, the attaching of main part 2 to tag carrier 11 is accomplished in an indirect way. More specifically: A foil 18 such as a polymer foil holds main part 2 between itself and tag carrier 11. In an area partially surrounding main part 2, foil 18 is bonded to tag carrier 11 using a bonding material such as a glue (indicated at 19 in FIG. 3, but not separately drawn). Thus, main part 2 is sandwiched between foil 18 and tag carrier 11.

Suitable tag carriers 11 are, e.g., sheet- or plate-shaped bodies, in particular cardboard or paperboard bodies. Below, a box such as a folding box will be described as a possible tag carrier, and further below, a card to be placed in a box will be described as a possible tag carrier.

FIG. 4 is a symbolic cross-sectional view of a retail unit 20, which includes a retail package having a tag 1 such as one of the before-described ones and a box 12 as an outer package, and a product 24, wherein the product 24 may be and usually is contained in a container 22, the container usually being located inside box 12, all as illustrated in FIG. 4. Product 24 may be a pharmaceutical product such as one provided in form of pills or capsules, and it is contained, in case of FIG. 4, in a blister package as a container 22. Usually, there is no further level of packaging between a box 12 and a container 22. Note that at least in case of pharmaceutical products, the product may be contained in a means for applying the product (such as in a syringe containing the product), this means being present in the container 22, e.g., a box 12 may contain a bag containing a syringe containing the product 24. Furthermore: At least in case of pharmaceutical products, there is usually also a package insert present in box 12, i.e. a leaflet explaining details concerning product 24 (not illustrated in any of the figures).

Box 12 usually is a folding carton. Pharmaceutical products (and also some other products) are sold (in retail) in folding cartons, at least in most cases. One such box may contain one or more containers 22. And one container may contain one or more doses of the product 24.

A main application of the present invention is related to retail packages and retail units, and thus to outer packages which reach the end user and to single packs, i.e. to the units given to end users such as patients, or—in case of pharmaceutical products given to a patient by a health care specialist—to the health care specialist.

FIG. 4 illustrates the possibility to attach tag 1 on the outside of box 12.

Usually, at least main part 2 is attached to a tag carrier 11, e.g., to a box 12. Alternatively or, rather, additionally, rip strip 3 is attached to the tag carrier 11, at least in one or more regions of rip strip 3.

FIG. 5 illustrates the possibility to attach tag 1 on the inside of a box 12, e.g, inside a folding box. FIG. 5 is a symbolic cross-sectional view of a retail unit 20 including a retail package having tag 1 such as one of the before-described ones and box 12 as an outer package, and a product 24, wherein the product 24 may be and usually is contained in a container 22, the container usually being located inside box 12, just as illustrated in FIG. 5. Product 24 may be a pharmaceutical product such as one provided in form of a liquid or a powder, and it is contained, in case of FIG. 5, in a bottle or flask as a container 22. Usually, there is no further level of packaging between box 12 and container 22. At least in case of pharmaceutical products, there is usually also a package insert present in box 12, i.e. a leaflet explaining details concerning product 24 (not illustrated in any of the figures).

Since tag 1 is located inside box 12, tampering with tag 1 is largely inhibited.

It is possible to provide that a rip strip 3 of a tag 1 is ripped or torn when a box 12 is opened. In particular, rip strip 3 can be arranged at and attached to a box 12 in such a way that this happens unavoidably (at least unless unusual measures are taken).

For example, in case of FIG. 5, e.g., with box 12 being a folding carton, it can be provided that the only side of the folding carton being designed to be opened in order to allow access to container 22 and thus to access product 24 is by moving (tilting) the upper side part of the folding carton in a direction perpendicular to the drawing plane. Thus, rip strip 3 will be ripped when opening box 12 and accessing product 24, respectively.

A tag 1, e.g., one as described above, and, more particularly, the corresponding electronics unit 40 can be structured and configured for detecting an interruption of a conductor line loop of rip strip 3 such as the one occurring in the way described above for FIG. 5 or in another way (e.g., by cutting rip strip 3 using a cutting tool or by ripping rip strip 3 by hand). And, moreover, this may result in a termination of the monitoring (and of the measurements and of the sensing) being accomplished (or at least evaluated) by the tag 1.

Accordingly, it can be provided that monitoring the integrity of a product 24 is carried out from a starting event (e.g., when product 24—and usually also a container 22—is packaged in the retail package and thus in a box 12) to an end point, wherein the end point is indicated by a ripping of rip strip 3, and wherein this ripping can be linked to an accessing of product 24, namely by providing that rip strip 3 is ripped when box 12 is opened. This way, or by prescribing (to a user such as a patient or a health care specialist) that the rip strip 3 shall be ripped when accessing product 24 (or container 22), it can be rather well ensured that the monitoring of the integrity of product 24 is terminated when product 24 is accessed. The integrity status of product 24 may, also in reaction to the ripping, be stored in tag 1 such that it can be recalled later (namely by operating switch 9, cf. FIGS. 1-3) and/or may be displayed by the display 6 of tag 1, e.g., by the emission of light pulses.

In order to accomplish a "forced" ripping upon accessing the product 24, as described in conjunction with FIG. 4, one can, e.g., provide that an opening of any openable sides results in a ripping of rip strip 3, e.g., by suitably bonding (e.g., gluing) rip strip 3 (of sufficient length) to each of the openable sides. Or it can be provided that only one side of box can be opened. The latter can be accomplished in case of a (standard) folding carton by sealing the other one of the two openable sides, e.g., by bonding (e.g., gluing) a flap to another side of the folding carton or by applying a self-adhesive piece of tape.

In case of FIG. 4, it could be provided that rip strip 3 is bent in the way indicated by the dashed arrow and bond it there to box 12.

As will have become clear, an attaching (bonding; gluing) of rip strip 3 to the tag carrier 11 (such as a box 12) can constitute a security measure for preventing tampering with the tag 1.

A beginning of the time span during which the physical or environmental conditions are monitored may be indicted by breaking another loop present on rip strip 3, cf. also FIG. 17 below. For example, dividing the rip strip of FIG. 1 along the dashed line s1 (and thus opening the longer one of the two loops present on rip strip 3) may be detected by electronics unit 40 (and more particularly by a control unit realized therein) by an increase of an ohmic resistance and make the electronics unit 40 start the monitoring. On the other hand, dividing the rip strip of FIG. 1 along the dashed line s2 (and thus opening the shorter one of the two loops present on rip strip 3; the longer one being already open) may be detected by electronics unit 40 (and more particularly by a control unit realized therein) by an increase of an ohmic resistance and make the electronics unit 40 terminate (stop) the monitoring.

FIG. 19 is another illustration of the possibility to provide a tag 1 on the inside of a box 12, e.g. inside a folding box. The embodiment of FIG. 19 is very similar to the one of FIG. 5. Therefore, refer to the description of FIG. 5 for further details. But the embodiment of FIG. 19 differs therefrom in that a portion of the tag 1 is attached to container 22. For FIG. 19 the case has been selected that main part 2 of tag 1 is attached to container 22. But it would also be possible to provide that rip strip 3 is attached to container 22 (as an alternative or in addition) or to have a non-attached rip strip 3 (merely connected to main part 2). Furthermore, for FIG. 19 the case has been selected that rip strip 3 is attached to the box 12, more particularly to an inner side of box 12. It is possible to provide that both, main part 2 and rip strip 3, are attached to container 22. However, with one of them attached to container 22 and the other to box 12, it can be effected that the rip strip 3 is ripped when taking container 22 (and thus product 24) out of box 12 in the usual or prescribed way. This can be a way of ensuring (with some degree of confidence) that monitoring is stopped when it is attempted to remove container 22 (and thus product 24) from box 12.

Figure 20:
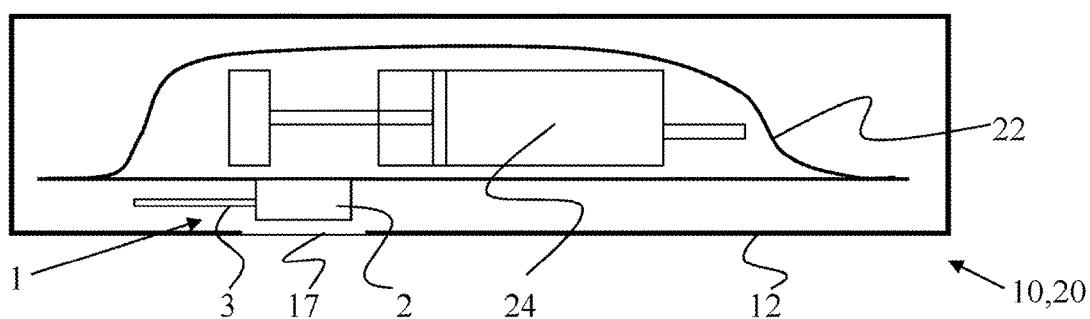
FIG. 20 a symbolic cross-sectional view of a retail unit.

FIG. 20 is another symbolic cross-sectional view of a retail unit 20. In this case, like in FIG. 19, tag 1 is attached to a container 22 present inside box 12. In this case, container 22 is a bag, which usually is at least partially constituted by a polymer foil, in particular by transparent polymer foil. Product 24 itself is present in a syringe, which is present inside container 22. In addition, FIG. 20 illustrates the possibility to have one portion of tag 1, e.g., as illustrated, main part 2, attached to container 22, whereas another portion, e.g., as illustrated, rip strip 3, is free (not directly attached to a package component).

FIGS. 6 to 11 are symbolic views of a retail package 10 or (in case a product is inside) a retail unit 20, at various stages. FIGS. 6, 8, 10 are top views, FIGS. 7, 9, 11 are side views. The setup is similar to the one of FIG. 5, but main part 2 of tag 1 is attached to an openable side part of the box 12, and rip strip 3 is partially inside and partially outside box 12 (when box 12 is closed and before it is opened).

In FIGS. 6-11, again the example of a folding carton as an outer package has been selected. In FIGS. 6 and 7, a tag 1, e.g., a tag of the before-described kind, is attached on the inner side of an openable side part 13 of box 12. Main part 2 and a first portion of rip strip 3 (close to main part 2) are bonded to openable side part 13. A distal portion of rip strip 3 is free (not attached to box 13), projecting from box 12 and, more particularly from side part 13.

In FIGS. 8 and 9, box 12 is closed and a flap or tongue 14 of box 12 is inserted. As is visible in the side view of FIG. 9, a portion of the rip strip 3 is bonded to another side part of box 12, namely the formerly projecting portion or a portion thereof.

It is possible to provide two conductor line loops on rip strip 3 as shown in FIG. 6 and in FIG. 1. Before forwarding the retail unit (usually shipping it from the manufacturer or packaging company to a distributor or retailer), the first loop can be interrupted, namely by ripping (cutting, tearing) rip strip 3 in a first region (where ripping interrupts the first but not the second loop, cf. dashed line s2 in FIG. 1), so as to start the monitoring of the integrity of the product. Such a breaking of an electrical connection has taken place between FIGS. 6, 7 and FIGS. 8, 9. The rip strip from which a first portion has been removed is referenced 3b in FIG. 9.

Alternatively, the monitoring can be started differently, cf. below at the description of FIG. 18 ("initiating switch"). In that case, a single conductor line loop may be sufficient, and rip strip 3 may remain unripped at least until after packaging, i.e. at least up to forwarding/shipping it. The whole projecting portion of rip strip 3 (cf. FIG. 6) is still present and continuous when it (or a portion of it) is bonded to box 12.

FIGS. 10, 11 show the situation when box is opened (in the intended way). Thus, this is the situation usually present when an end-user such as a patient or a health care specialist is about to use or apply (or firstly use or apply) the product 24 retailed in retail package 10. By pulling out flap 14 and turning side part 13, another ripping of the rip strip takes place, such that the monitoring is ended and a final integrity status is obtained by tag 1 and/or stored in tag 1 and/or displayed by tag 1. By that ripping, the other conductor line loop is interrupted (cf. dashed line s1 in FIG. 1), such that merely a portion 3a of rip strip 3 remains with main part 2 on side part 13 of box 12, and another portion, referenced 3c in FIG. 11, remains at the other side part of box.

Figure 13:
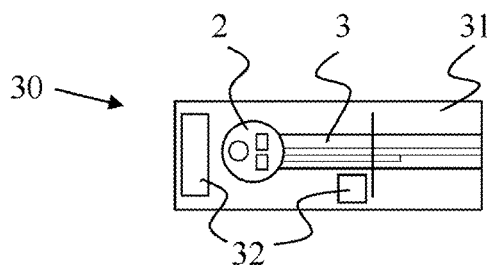
FIG. 13 a symbolic top view onto the card with attached electronic tag of FIG. 12.

FIGS. 12 and 13 illustrate another way of using a tag 1 such as the above-described tag 1. FIG. 12 is a symbolic cross-sectional view of a retail unit 20 containing a card unit 30 (as a tag carrier) including and, in particular, substantially consisting of a card 31 with attached electronic tag 1, and FIG. 13 is a symbolic top view onto the card unit 30 of FIG. 12.

In the case of FIGS. 12 and 13, tag 1 is not attached to box 12, and thus, the above-described effect of unavoidably breaking an electrical contact (and thus providing a signal for stopping the monitoring) when opening box 12 is not achieved.

Tag 1 is bonded to card 31, wherein usually both, main part 2 and rip strip 3 are bonded to card 31. On card 31, one or more text areas 32 may be provided in which text and/or figures are printed. Corresponding text and/or figures may be explicative for the use of card unit 30 and, more particularly for the use of tag 1. In particular, in text areas 32, it may be explained that card 31 (and more particularly rip strip 3) shall be cut or ripped in a prescribed region, such in the location indicated on card 31, cf. the dotted line in FIG. 13.

When shipping retail unit 20, not only container 22 (in FIG. 12 a tube) is present inside box 12, but also card unit 30 (and usually also a package insert explaining details concerning product 24). Box 12 can be a folding carton, and card 31 (functioning as the tag carrier) can be a piece of cardboard or paperboard.

Similarly to the explanations given above in conjunction with FIGS. 6-11, also in case of a card unit 30, it is possible to provide only a single loop (for stopping the monitoring of the product integrity) or two provide an additional loop, the latter being used for starting the monitoring. FIG. 13 illustrates the latter case.

Figure 14:
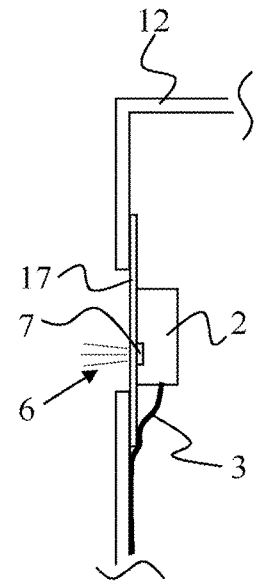
FIG. 14 a detail of a symbolic cross-sectional view of a retail package with an electronic tag visible through a window.

FIG. 14 shows a detail of a symbolic cross-sectional view of a retail package 20 with an electronic tag 1 visible through a transparent portion or window 17 of box 12. Tag 1 may be a tag 1 as described above. Main part 2 of tag 1 is located inside box 12, and window 17 and tag 1 are arranged such that the display (cf., e.g., display 6 in FIG. 1) of tag 1 is visible through window 17. Rip strip 3 may be fully inside box 12, or may be partially outside box 12, e.g., bonded to box 12 (like, e.g., in FIGS. 9, 11) or free (like in FIG. 4).

In an arrangement as illustrated in FIG. 14, it is readily possible to obtain information about the product integrity in particular without opening the package. It can be provided that operating switch 9 results in display 6 displaying data related to the product integrity, more specifically in an emission of visible signals indicating the (current) product integrity status.

In FIG. 14, and more particularly in view of the arrangement and fixing of main part 2, it may be advantageous to provide that switch 9 is a contactless switch such as a capacitive switch.

Figure 15:
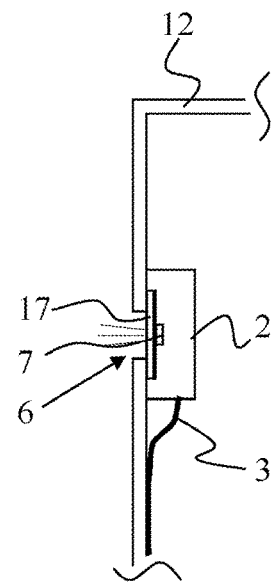
FIG. 15 a detail of a symbolic cross-sectional view of another retail package with an electronic tag visible through a window.

The embodiment of FIG. 15 is very similar to the one of FIG. 14 and illustrates a detail of a symbolic cross-sectional view of another retail package 20 with an electronic tag 1 visible through a window 17. Merely the arrangement of tag 1 and window 17 and the way of fixing tag 1 to box 12 is different. Depending on the concrete design, an arrangement according to FIG. 15 may be mechanically more stable. Main part 2 is directly (and, e.g., at its circumference) attached to a side part of box 12. It may or may not be attached to window 17, too.

As is clear from the above, a display 6 of a tag 1 of one of the above-described kinds may comprise one or more light emitters such as LEDs, in particular light emitters of different color, e.g., one emitting red light and another emitting green light. A control unit of tag 1, e.g., an integrated circuit, e.g., the one of FIGS. 2, 3, may control the display 6 to emit light pulses, more particularly sequences of light pulses (wherein already a single light pulse shall be considered a sequence of light pulses). Emitted light pulses in a sequence may differ in at least one of color, duration, intensity. Assuming that color is a parameter which can be varied for displaying integrity status information, generally, the emission of green light may be emitted in order to indicate that the product integrity is still in order, and the emission of red light may be emitted in order to indicate that the product integrity is not in order anymore.

Assuming that in addition, the duration (of a pulse in a sequence) is a parameters which can be varied for displaying integrity status information, it can be provided, e.g., that two or more types of alarm (or types of failures) are indicated by different pulse durations. An example will be illustrated and described by means of FIG. 16.

Figure 16:
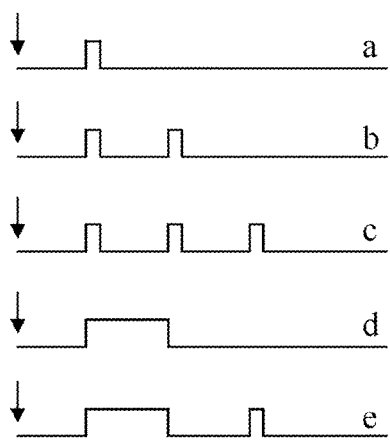
FIG. 16 an illustration of sequences of light pulses emittable by an electronic tag.

FIG. 16 is an illustration of sequences of light pulses emittable by an electronic tag 1 such as by an above-described tag 1. The curves "a" to "e" illustrate different sequence which may be emitted in 5 different cases, i.e. in five different integrity statuses. The horizontal axis is the time axis, the vertical axis is the light intensity axis, intensities being either zero or a maximum value.

One way of distinguishing three types of failures (one, two or three of which may have occurred and thus may have to be indicated when displaying the integrity status) works as follows:

If a failure of a first type has occurred, a single short red pulse is emitted (cf. curve a).

If a failure of a second type has occurred, a two short red pulses are emitted (cf. curve b).

If failures of both, first and second type, have occurred, a three short red pulses are emitted (cf. curve c).

If a failure of a third type has occurred, a single long red pulse is emitted (cf. curve d).

If, in addition to a failure of the third type, a failure of the first and/or a failure of the second type has occurred, the (partial) sequence for the additional failure(s) is appended to the long red light pulse indicating the third type failure. Curve e indicates the case that a failure of a first type and a failure of a third type have occurred.

A failure of first type may mean, e.g., that an upper temperature limit T(up) has been exceeded.

A failure of second type may mean, e.g., that a lower temperature limit T(low) has been fallen short of.

A failure of third type may mean, e.g., that a threshold temperature limit T(thr) has been exceeded (or fallen short of) for a too long time, more particularly for more than a predescribed threshold time t(thr).

Figure 21:
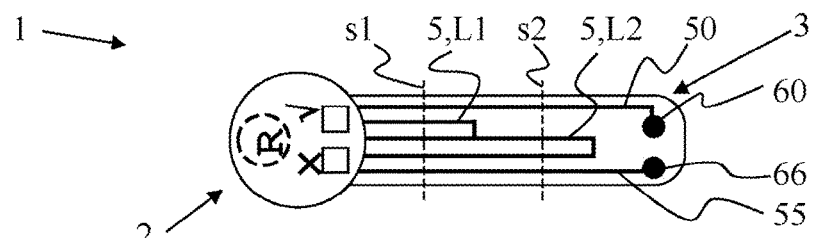
FIG. 21*a* top view onto an electronic tag.

Such a kind of data indicative of predescribed limitations of a product, e.g., T(up), T(low), T(thr) and t(thr), are usually stored in the electronics unit. They may be programmable in a way described further above in the present patent application. If programming pads are provided for programming such values, these may in particular be provided on the rip strip. FIG. 21 illustrates a possible design of a rip strip with contact pads for programming such values.

FIG. 21 shows an illustration of a top view onto an electronic tag 1. This tag 1 can be largely identical with other tags described in the present patent application, such as tag 1 of FIG. 1, but the rip strip 3 is designed to provide two contact pads 60, 66. While conductor lines 5 form two loops L1, L2, which may (as illustrated) partially overlap and are readily interrupted by ripping rip strip 3 along separation lines s1, s2, conductor line 50 provides an electrical connection between pad 60 and the electronics unit of tag 1, and conductor line 55 provides an electrical connection between pad 66 and the electronics unit of tag 1. Via contact pads 60, 66, data indicative of predescribed limitations of a product to be monitored (such as the above-mentioned T(up), T(low), T(thr) and t(thr)) may be programmed before ripping rip strip 3 along s1 or s2.

In the process of packaging products, a (high) number of such tags 1 may be present, and an arbitrary one of them is selected for the next product, and then—when the type of product to be packaged is known—the data indicative of predescribed limitations of that specific product for the exposure of that specific product to the monitored physical or environmental conditions are programmed (using pads 60 and 66). This way, in a single packaging line, the provision of a single type of tag 1 can be sufficient for packaging (and monitoring) in that packaging line a plurality of different products (with different predescribed limitations). Accordingly, storing various different types of tags, each specifically designed for the different products to be packaged (set to the respective specific predescribed limitations for the exposure of the product to the physical or environmental conditions), may become superfluous this way.

And starting the monitoring by opening loop L2, e.g., by cutting along line s2, will simultaneously make a reprogramming of tag 1 difficult, thus impeding tampering with the tag.

If product integrity is in order, this may be indicated by one or more green light pulses. It is, more specifically, possible to distinguish different types of (still-)in-order statuses. For example, in a first case, a single green pulse is emitted, cf., e.g., curve a or curve e. And in a second case, two green pulses are emitted, cf., e.g., curve b, or more than two pulses are emitted, or green an red pulses are emitted.

The first (still-)in-order status case may be, e.g., that no threshold value has been reached. In case a temperature is monitored, this would be the case, e.g., if the temperature never left the range at which the product may be kept forever or (as more often will be the case) until its expiration date.

The second (still-)in-order status case may be, e.g., that for more than a pre-selected time duration, a threshold value has been exceeded and fallen short of, respectively, (depending on the threshold being an upper and a lower threshold value, respectively). For example, in case a temperature is monitored, this would be the case, e.g., if the temperature of the product may be above an upper threshold of, e.g., 37° C. for at most, e.g., 72 hours, and an alarm is desired as soon as only 24 hours or less are left (24 hours being the pre-selected time duration). If then the temperature has in fact been above 37° C. for already more than 48 hours, such that the product will be in order for only less than 24 hours (provided that its temperature will remain above 37° C.), the second (still-)in-order status shall be indicated.

Figure 17:
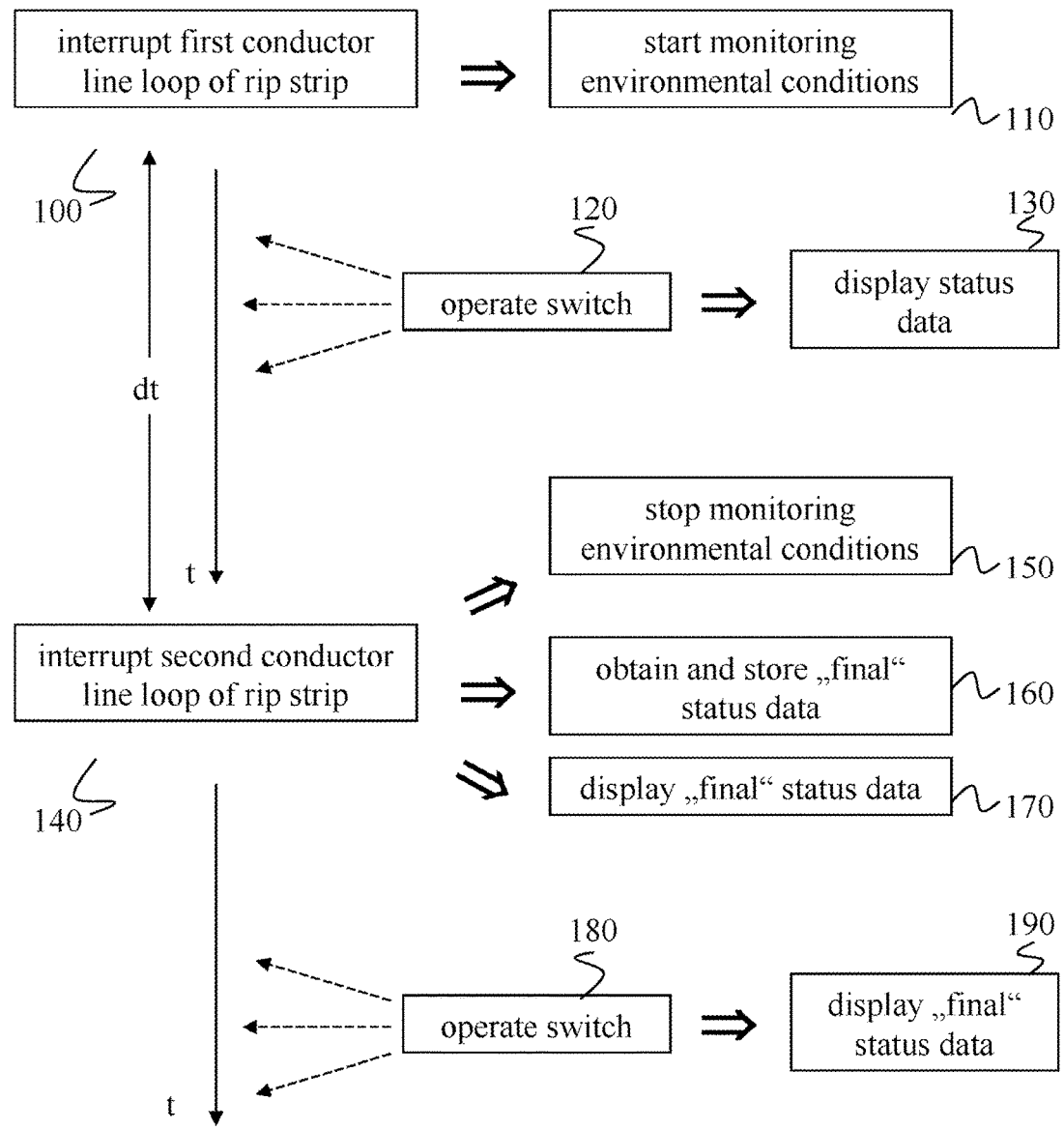
FIG. 17 an illustration of method steps.

FIG. 17 illustrates method steps. Reference symbol t denotes the time, dt denotes the time span during which monitoring takes place. In steps 100, 110, the time span during which integrity monitoring shall take place is started by interrupting a first electrical contact, e.g., by opening a conductor line loop, cf. also dashed line s2 in FIG. 1. Operating switch 9 during the subsequent time span (step 120) results in a displaying of the status data (step 130).

Interrupting another electrical contact (cf. step 140) results in terminating the time span and the monitoring (step 150), obtaining the final status data (step 160) and displaying the final status data (step 170). When later on, switch 9 is operated (step 180), the final status data are displayed (step 190).

It is to be noted that usually, the status data will not be permanently displayed, but only when the switch 9 is operated; and optionally also when the time span (and thus the monitoring) is terminated and/or optionally in (regular) time intervals (controlled by the control unit), the time intervals being usually between 1 second and 2 minutes, more particularly between 10 seconds and 1 minute.

Figure 18:
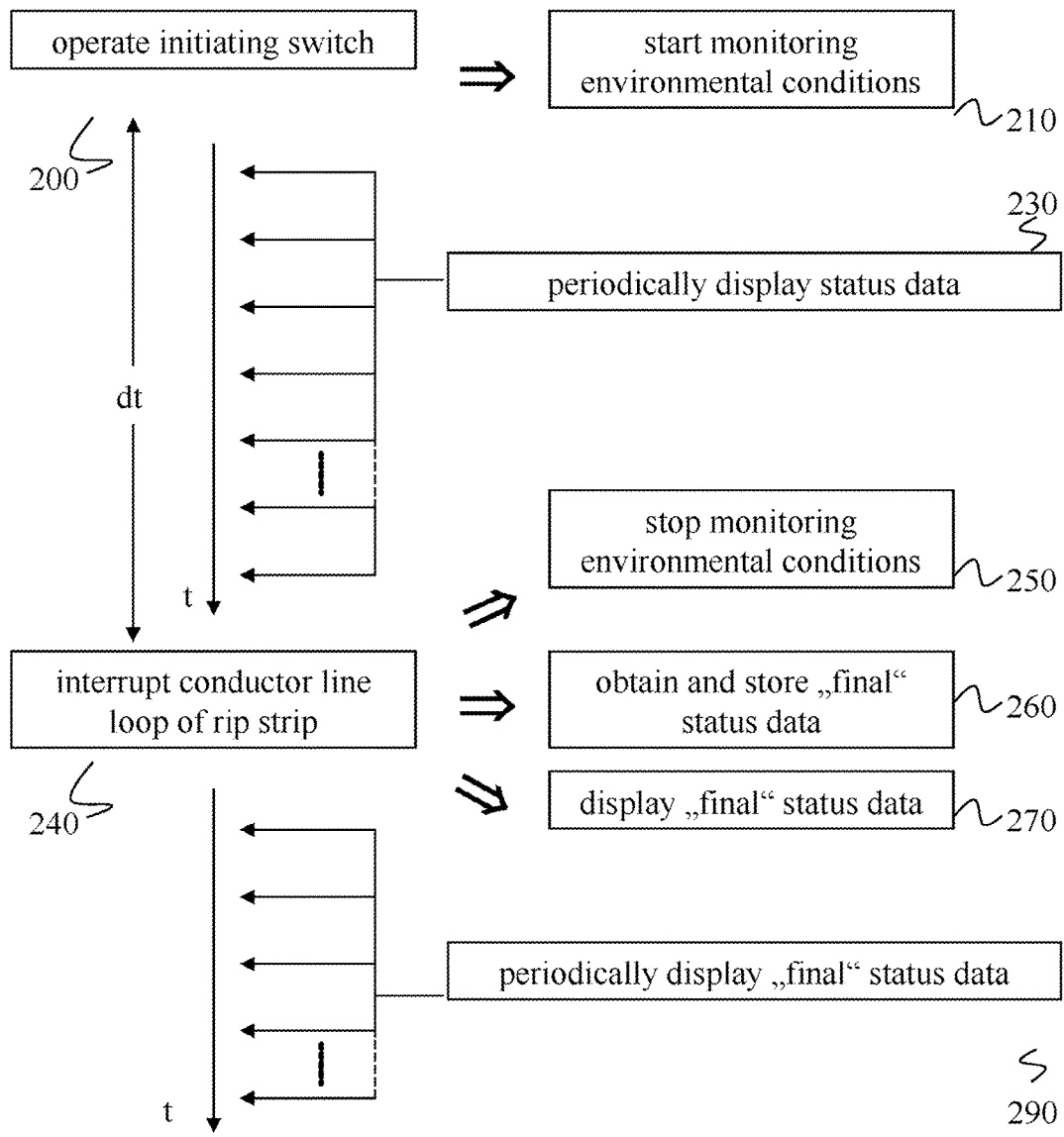
FIG. 18 an illustration of method steps.

FIG. 18 is another illustration of method steps, similar to the one of FIG. 17. It illustrates an example for the case that no switch is required for displaying the status data. Instead, the status data are displayed periodically, before and after terminating the monitoring, cf. steps 230 and 290. And FIG. 18 also illustrates an example for the case that monitoring is started without needing a rip strip for that purpose. Instead, the monitoring is started in reaction to the operation of a switch, referred to as initiating switch, cf. step 200. It can be referred to FIG. 2 for illustrating a corresponding electronic tag 1, wherein the item referenced 9 in this case is interpreted as such an initiating switch, i.e. as a switch, when operated, effecting that the monitoring starts. Such a switch may be an electro-mechanical switch, a capacitive switch, a magnetic switch or an inductive switch. Note that it is possible to nevertheless provide in this case a rip strip—in particular for the purpose of terminating the monitoring. But alternatives thereto are possible, e.g., a switch (e.g., the before-mentioned initiating switch) may be provided for that purpose.

Otherwise, the method and the corresponding retail package and tag may be as described elsewhere in the present patent application.

Note that the initiating switch may in particular be a magnetic or inductive switch. For example, the manufacturing of the retail package or retail unit may include moving the same along a path along which a suitable magnet (permanent or electromagnet) and a suitable coil, respectively, is suitably positioned, e.g., along a path described by a conveyor transporting the retail package or retail unit. Then, while passing along the respective magnetic or electric field, the initiating switch is operated (without mechanically contacting the tag), and the monitoring starts. However, the initiating switch might also be an electromechanical or a capacitive switch, the latter also allowing a contact-free operation.

Of course, it is also possible to provide in the embodiment of FIG. 18 the before-described switch by means of which a displaying of the status data can be initiated (display switch). This switch (sufficiently described above) may be identical with the initiating switch or be an additional switch. In case the switches are identical, it may be provided that different effects may be provoked by differently operating the switch. For example, a brief operation of the switch (e.g., for at most 1.5 seconds) provokes a displaying of the status data, whereas a longer operation (e.g., for st least 3 seconds) can effect that the monitoring starts. Moreover, the function of the rip strip (for terminating the monitoring) may also be assumed by the switch, e.g., termination of monitoring is in that case effected in reaction to operating the switch for an even longer time (e.g., for at least 8 seconds). In this case, the rip strip may be dispensed with.

The tag, the retail package and the retail unit described in the present patent application are easy to use and operable by untrained personnel, i.e. by people not specifically instructed on how to use the tag, the retail package, the retail unit, as far as the integrity monitoring is concerned. In case of pharmaceutical products, patients and health care specialists who apply or use the pharmaceutical product can, without additional measures and without the need of additional tools, check the integrity of the product to be applied or used. And this can be accomplished (at least approximately) at the time when the product is applied or used.

It can happen that products, in particular also pharmaceutical products, are returned from the acquirer or user (e.g., patient or health care specialist) to the manufacturer or the distributor without having been used. This sometimes is the case, e.g., in case of particularly valuable products.

If the product is returned to the manufacturer or distributor, the manufacturer or distributor can check the integrity status of the product by using the tag. Based thereon, it can, e.g., be decided whether or not to forward the product to another acquirer or user.

Independently of having checked the integrity status or not, it may be provided that the manufacturer or distributor forwards the product to another acquirer or user. That other acquirer or user can then (usually when the box is opened and the product is to be applied) check the integrity status of the product using the herein described tag.

And it can be verified by the other acquirer or user (and also by the manufacturer or distributor, cf. above), that the outer package such as the box 12, in particular the folding carton, is not tampered with, and—if the security measures described above are taken—he or she can feel safe that the product integrity displayed by the tag 1 when the box 12 is finally opened, is indeed correct and can be relied on.

It shall be noted that the tag, the retail package and the retail unit provide standalone solutions which do not require further equipment. And the attaching of the tag to a box can be accomplished by the manufacturer or by the packaging company packaging the product in the box (typically packing the container or containers containing the product in the box).

The tag may consist of merely
an electronics unit; and
a PCB (typically a flexible PCB) forming the rip strip and the PCB on which the components of the electronics unit are mounted;
wherein the electronics unit may consist merely of
a switch (and possibly also a second switch—namely, e.g, for starting the monitoring);
one or more, typically two, light emitters, typically LEDs;
an integrated circuit (embodying at least the control unit); and
an energy source such as a battery;
wherein, if the one or more sensors are not integrated in the integrated circuit, at least one sensor is, in addition, comprised, too, in the electronics unit, and
wherein up to four capacitors and/or up to four resistors may be comprised, too, in the electronics unit. And typically, all components comprised in the electronics unit are mounted on the PCB, more precisely on one and the same PCB.

Note that the PCB can be sufficient for electrically contacting the energy source (battery), cf. FIGS. 2, 3, such that no separate battery holder needs to be provided. And note furthermore, that in particular aspects of the invention (cf. above, e.g., first and second particular aspects of the invention), the rip strip may be dispensed with (at least in its function as providing a means for starting the monitoring) and/or the switch may be dispensed with (at least in its function as a means for requesting a displaying of the status data, and this at least for times not coinciding with the time of terminating the monitoring).

A display of an above-described kind can be particularly small and cost-efficient. There is no need for a liquid crystal display or the like.

The invention claimed is:
1. A retail package for a perishable product, said retail package comprising:
a box as an outer package;
an electronic tag for obtaining information relating to integrity of the product as assessed from an exposure of said product to physical or environmental conditions during a time span, wherein said physical or environmental conditions include at least one of temperature, humidity, pressure and acceleration;
said tag comprising:
a main part comprising an electronics unit;
a rip strip comprising a breakable electrical connection operationally connected to said electronics unit;
said electronics unit comprising:
a control unit;
a sensor unit comprising at least one sensor for monitoring said physical or environmental conditions;
a display unit comprising a display for displaying data relating to said integrity referred to as status data;
a switch;
wherein said control unit is structured and configured to:
detect a breaking of said electrical connection;

terminate said monitoring in reaction to detection of said breaking of said electrical connection; and to effect that said display unit displays said status data in reaction to an operation of said switch.

2. The package according to claim 1, wherein said perishable product is a pharmaceutical product.

3. The package according to claim 1, wherein said main part is attached to an inside of said box.

4. The package according to claim 1, wherein said box is a folding carton.

5. The package according to claim 1, wherein said rip strip is attached to an inside of said box.

6. The package according to claim 5, wherein said box is designed to have one or more opening sides at which the box can be opened in order to access said product when the product is present inside the box, and wherein said rip strip is attached to said box in such a way that said electrical connection is broken when the box is opened at one of said opening sides.

7. The package according to claim 1, wherein said rip strip comprises or essentially is a printed circuit board in and/or on which at least one conductor line is present that is operationally connected to said electronics unit, said at least one conductor line forming said breakable electrical connection.

8. The package according to claim 1, wherein said display unit comprises one or more light emitters for emitting light pulses, and wherein said data is encoded in a sequence of light pulses emitted by said one or more light emitters, said data is encoded in one or more of:
    the color of the light pulses;
    a duration of the light pulses;
    the number of the light pulses in the sequence.

9. A retail unit comprising a retail package according to claim 1, further comprising said perishable product.

10. The retail unit according to claim 9, wherein said retail unit is a pharmaceutical retail unit, and said perishable product is a pharmaceutical product.

11. The retail unit according to claim 9, wherein said retail unit comprises one or more containers containing said product.

12. A method for monitoring an integrity of a perishable product, the method comprising the steps of:
    providing an electronic tag; and
    providing a box as an outer package for said perishable product;
wherein said tag is a tag for obtaining information relating to the integrity of the product as assessed from an exposure of said product to physical or environmental conditions during a time span, wherein said physical or environmental conditions include at least one of temperature, humidity, pressure and acceleration, the tag comprising:
    a main part comprising an electronics unit;
    a rip strip comprising a breakable electrical connection operationally connected to said electronics unit;
said electronics unit comprising:
    a control unit;
    a sensor unit comprising at least one sensor for monitoring said physical or environmental conditions;
    a display unit comprising a display for displaying data relating to said integrity referred to as status data;
    a switch;
wherein said control unit is structured and configured to perform the steps of:
    detecting a breaking of said electrical connection;
    terminating said monitoring in reaction to said detecting said breaking of said electrical connection; and effecting that said display unit displays said status data in reaction to an operation of said switch.

13. The method according to claim 12, comprising at least one of the steps of
    bonding said main part to said box;
    bonding at least a portion of said rip strip to said box.

14. The method according to claim 12, comprising at least one of the steps of:
    ripping said rip strip;
    operating said switch.

15. A method for manufacturing a retail unit comprising a perishable product, said method comprising the steps of:
    a) providing said product;
    b) providing an unfolded folding carton;
    c) folding said folding carton;
    d) inserting said product into the folded folding carton;
    e) providing an electronic tag for obtaining information relating to the integrity of the product as assessed from an exposure of said product to physical or environmental conditions during a time span, wherein said physical or environmental conditions include at least one of temperature, humidity, pressure and acceleration, said tag comprising a main portion and a rip strip;
    f) attaching said tag to said folding carton;
    wherein said tag comprises:
        said main part comprising an electronics unit;
        said rip strip comprising a breakable electrical connection operationally connected to said electronics unit;
    said electronics unit comprising:
        a control unit;
        a sensor unit comprising at least one sensor for monitoring said physical or environmental conditions;
        a display unit comprising a display for displaying data relating to said integrity referred to as status data;
        a switch;
    wherein said control unit is structured and configured to perform the steps of:
        detecting a breaking of said electrical connection;
        terminating said monitoring in reaction to said detecting said breaking of said electrical connection; and for
        effecting that said display unit displays said status data in reaction to an operation of said switch;
    the method further comprising the step of:
    g) starting monitoring said exposure of said product to said physical or environmental conditions by manipulating a part of said tag.

16. An electronic tag for obtaining information relating to the integrity of a product as assessed from an exposure of said product to physical or environmental conditions during a time span, wherein said physical or environmental conditions include at least one of temperature, humidity, pressure and acceleration, said tag comprising:
    a main part comprising an electronics unit;
    a rip strip comprising a breakable electrical connection operationally connected to said electronics unit;
said electronics unit comprising:
    a control unit;
    a sensor unit comprising at least one sensor for monitoring said physical or environmental conditions;
    a display unit comprising a display for displaying data relating to said integrity referred to as status data;
    a switch;
wherein said control unit is structured and configured to:
    detect a breaking of said electrical connection;
    terminate said monitoring in reaction to said detection of breaking of said electrical connection; and effect that said display unit displays said status data in reaction to an operation of said switch.

17. The method according to claim 12, further comprising the steps of:
calculating and storing final status data in response to breaking of said electrical connection.

18. The method according to claim 17, comprising the further step of:
displaying said final status data on said display device for a predetermined period of time when monitoring is terminated.

19. The package according to claim 1, wherein data representative of prescribed limitations of sensed physical or environmental conditions is stored in said electronics unit, and said physical or environmental conditions sensed by the sensor are compared to the stored prescribed limitations to determine the integrity of the product.

20. The package according to claim 19, wherein the product is determined to have integrity if the sensed physical or environmental conditions are within a range of the prescribed limitations and the product is determined to have lost integrity if the sensed physical or environmental conditions are outside the range of the prescribed limitations.

21. The package according to claim 1, wherein the display unit displays status data indicating that the integrity of the product is not acceptable if the product has been subjected to physical or environmental conditions that are outside a range of the prescribed limitations.

22. The package according to claim 1, wherein the physical or environmental conditions are monitored by said sensor to determine whether a threshold value, indicative that the product has lost integrity, has been reached.

23. The method according to claim 12, comprising the further steps of:
storing data representative of prescribed limitations of sensed physical or environmental conditions in said electronics unit, and
comparing said physical or environmental conditions sensed by the sensor to the stored prescribed limitations to determine the integrity of the product.

24. The method according to claim 12, comprising the further step of:
upon operation of said switch, displaying status data indicating that the product is not acceptable when the product has been subjected to physical or environmental conditions outside a range of prescribed limitations.

25. The method according to claim 12, wherein the sensor measures physical or environmental conditions at predetermined time intervals.

26. The method according to claim 15, wherein data representative of prescribed limitations of sensed physical or environmental conditions is stored in said electronics unit, and said physical or environmental conditions sensed by the sensor are compared to the stored prescribed limitations to determine the integrity of the product.

27. The method according to claim 26, wherein the product is determined to have integrity if the sensed physical or environmental conditions are within a range of prescribed limitations and the product is determined to have lost integrity if the sensed physical or environmental conditions are outside the range of prescribed limitations.

28. The electronic tag according to claim 16, wherein data representative of prescribed limitations of sensed physical or environmental conditions is stored in said electronics unit, and said physical or environmental conditions sensed by the sensor are compared to the stored prescribed limitations to determine the integrity of the product.

29. The electronic tag according to claim 28, wherein the product is determined to have integrity if the sensed physical or environmental conditions are within a range of prescribed limitations and the product is determined to have lost integrity if the sensed physical or environmental conditions are outside the range of prescribed limitations.

* * * * *